Figure 1:
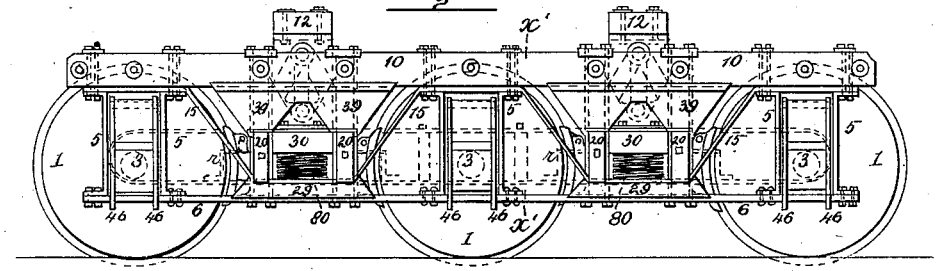

(Model.)

5 Sheets—Sheet 1.

E. R. ESMOND.
CAR TRUCK.

No. 247,814.  Patented Oct. 4, 1881.

Witnesses.
John D. Ledlock
H. D. Williams

E. Richard Esmond.
Inventor
per Alfred Shevlock
Atty.

(Model.)
5 Sheets—Sheet 2.
E. R. ESMOND.
CAR TRUCK.
No. 247,814.
Patented Oct. 4, 1881.
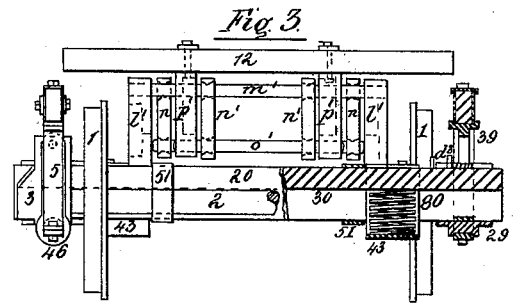
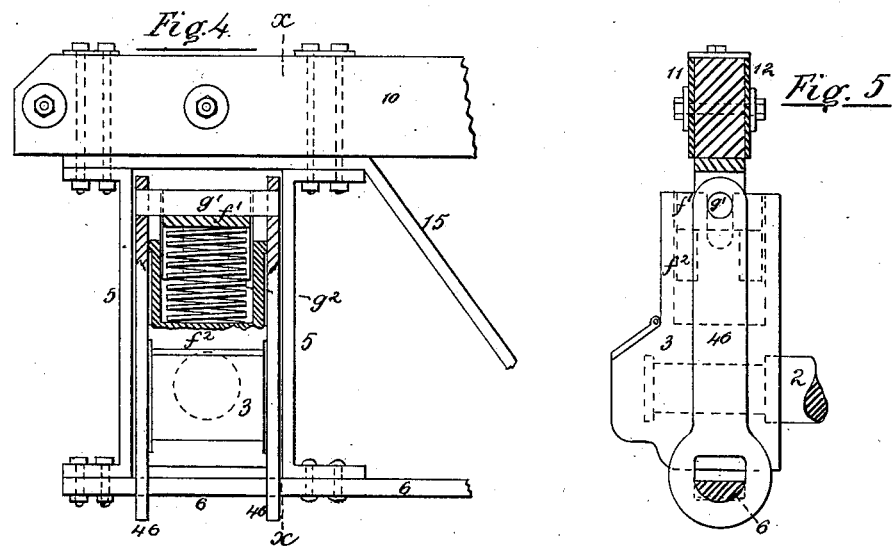
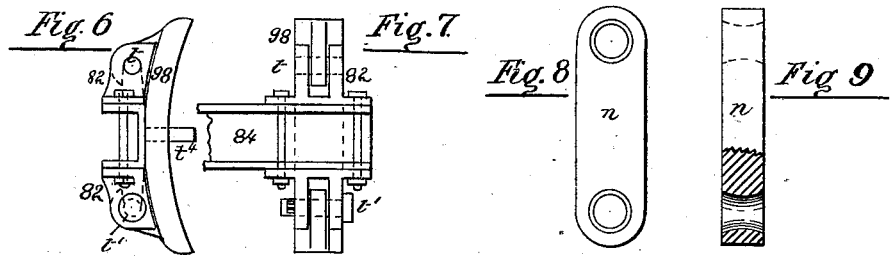
Witnesses.
John D. Thedlock
H. D. Williams.
E. Richard Esmond.
Inventor.
per Alfred Thedlock
Atty.

(Model.)

5 Sheets—Sheet 3.

E. R. ESMOND.
CAR TRUCK.

No. 247,814.

Patented Oct. 4, 1881.

Witnesses.
John D. Thedwick
H. D. Williams.

E. Richard Esmond.
Inventor:
per Alfred Thedlock.

(Model.)

5 Sheets—Sheet 4.

E. R. ESMOND.
CAR TRUCK.

No. 247,814. Patented Oct. 4, 1881.

Witnesses.

C. Richard Esmond
Inventor.
per Alfred Shedlock
Atty.

(Model.)

5 Sheets—Sheet 5.

E. R. ESMOND.
CAR TRUCK.

No. 247,814. Patented Oct. 4, 1881.

Witnesses.

E. Richard Esmond
Inventor.
per Alfred Thedlock
atty.

N. PETERS. Photo-Lithographer, Washington, D. C.

UNITED STATES PATENT OFFICE.

E. RICHARD ESMOND, OF BROOKLYN, NEW YORK.

CAR-TRUCK.

SPECIFICATION forming part of Letters Patent No. 247,814, dated October 4, 1881.

Application filed March 1, 1880. (Model.)

*To all whom it may concern:*

Be it known that I, E. RICHARD ESMOND, of the city of Brooklyn, county of Kings, State of New York, have invented certain new and useful Improvements in Car-Trucks, of which the following is a specification.

This invention relates to railroad-car trucks and embodies the suspension-link principle, covered by Letters Patent of the United States granted to me, assignee of Wm. H. H. Sisum, numbered 208,857, and bearing date October 8, 1878; and it has for its objects—

First. To prevent any lateral movement between the car-body and the truck, as I have found in practice that any such movement is detrimental to the proper working of this class of car-trucks. This I accomplish by making the lower shaft, which is secured in reverse standards projecting downwardly from the body-bolster of the car, and which passes through the lower ends of the longitudinal suspension-links, so that its ends just touch the insides of the truck-standards, which carry the shaft passing through the upper ends of the links. All of the holes in the links are formed cylindrically tapering from both sides of them, so that the truck and car-body are free to move longitudinally and swivel in relation to each other, but are prevented from moving laterally by the lower shaft fitting between the truck-standards.

Secondly. In adapting the said suspension-link principle to six-wheel trucks by employing two sets of longitudinal suspension-links arranged one pair between each adjacent two pairs of wheels, thus supporting the car-body at each end at two points, longitudinally, instead of at one, as with the ordinary center plates and side bearings, the set of links with their shafts nearest the end of the car-body being constructed as just before described, and the other set having the links formed in the same manner, but so arranged that their lower ends and the shaft which is secured to the car-body are free to move laterally in relation to the truck, thus allowing the truck and car-body to swivel relatively to each other from a center somewhere over the central line of the set of suspension-links nearest the end of the car-body.

Thirdly. To insure against the possibility of any damage being done to the lower or transverse suspension-links by the truck coming in contact with any obstacle, and to strengthen the truck generally by so constructing the frame-work of the truck that these transverse suspension-links, which hang against the sides of the axle-boxes, are surrounded by portions of the frame-work, thus forming rigid pedestal protection for the axle-boxes and links, allowing the axle-boxes and links to move laterally to the side frames, and at the same time making said truck-frame of cheap construction and very light, strong, and durable.

Fourthly. To provide a ready and efficient means for holding the brake-beams, and also by such a construction of the brake-shoes that they may be quickly reversed in position when they become unevenly worn, all of which will be fully hereinafter described by reference had to the accompanying drawings, forming part of this specification, in which—

Figure 2:
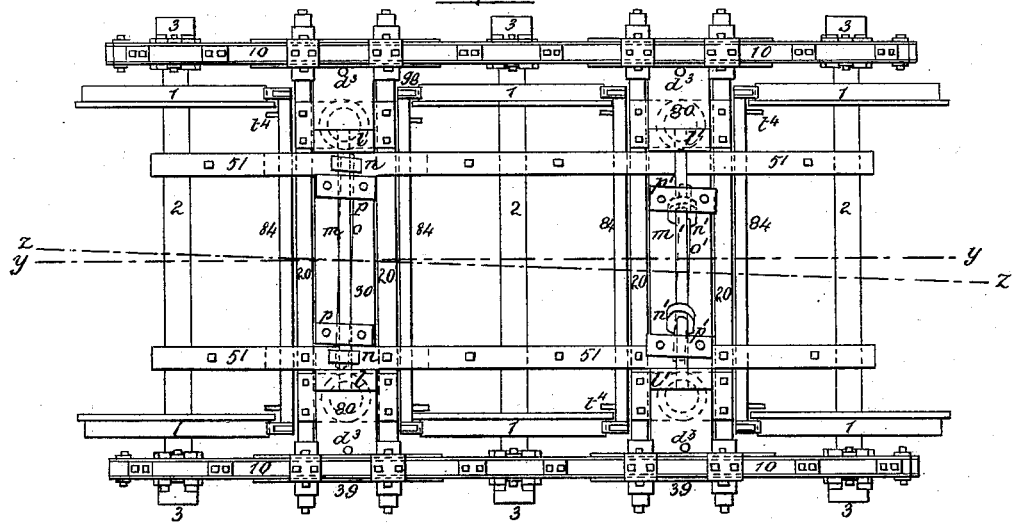
Figure 10:
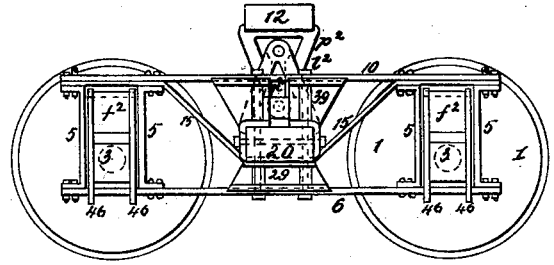
Figure 11:
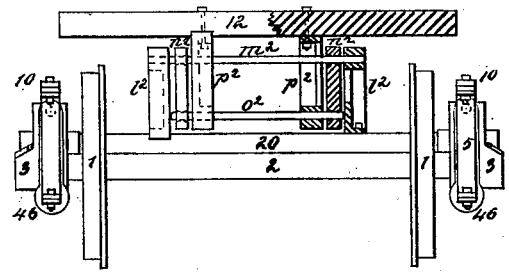
Figure 12:
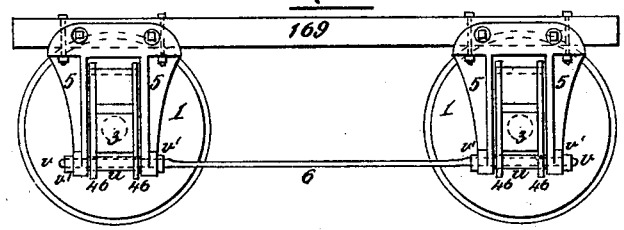
Figure 13:
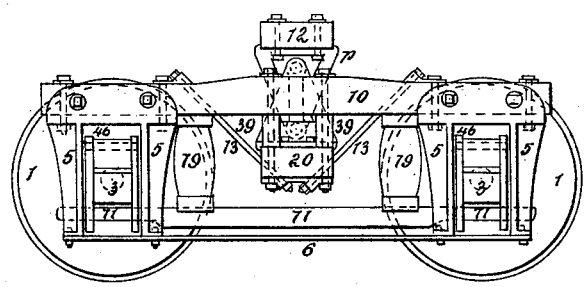
Figure 14:
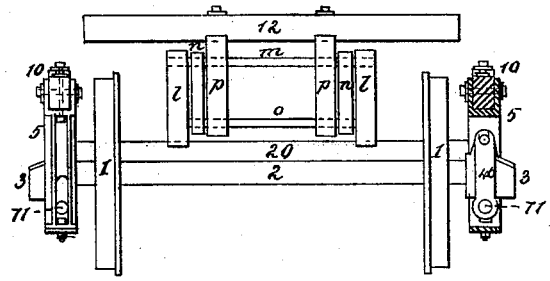
Figure 15:
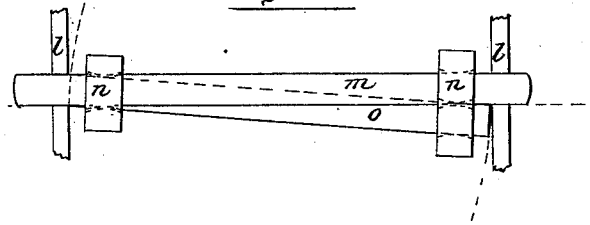
Figure 16:
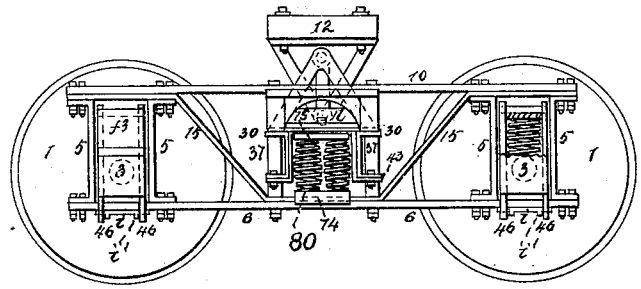
Figure 17:
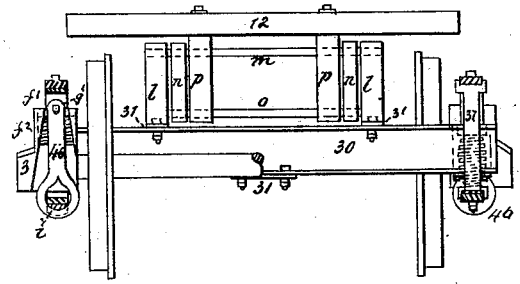

Figure 1, Sheet 1, is a side elevation of a six-wheel passenger-truck embodying my said improvements. Fig. 2, Sheet 1, is a plan view of the same. Fig. 3, Sheet 2, is an end view, partly in section. Fig. 4, Sheet 2, is an enlarged view of one of the axle-boxes and its transverse suspension-links and their protecting-pedestals, showing the upper part of the box in section. Fig. 5, Sheet 2, is an end sectional view of Fig. 4, cut through the line *x x*. Fig. 6, Sheet 2, is an enlarged side elevation of one of the brake-shoes. Fig. 7, Sheet 2, is a rear view of the same. Fig. 8, Sheet 2, is an enlarged side elevation of one of the longitudinal or upper suspension-links. Fig. 9, Sheet 2, is a front view of the same, partly in section. Fig. 10, Sheet 3, is a side elevation of a four-wheel freight-truck. Fig. 11, Sheet 3, is an end view of the same, partly in section. Fig. 12, Sheet 3, is a side elevation, showing the lower or transverse suspension-links and the axle-boxes, in combination with cast-iron pedestals. Fig. 13, Sheet 4, is a side view of a truck, representing the manner in which equalizing-bars are applied to car-trucks embodying the suspension-link principle. Fig. 14, Sheet 4, is an end view of the same. Fig. 15, Sheet 4, is an enlarged plan view of the upper suspension-links. Fig. 16, Sheet 5, is a side elevation of a car-truck, showing further modifications. Fig. 17, Sheet 5, is an end view of the same, partly in section.

The side frames of the trucks are composed of longitudinal wheel-piece 10 and bar 6. The wheel-piece 10 in the six-wheel passenger-truck is constructed of a beam of wood, covered on the two sides with plates of iron 11 and 12, held together by bolts passing through them, and the bar 6 consists of flat wrought-iron, as clearly shown in the enlarged views, Figs. 4 and 5. The longitudinal wheel-piece 10 and bar 6 are connected together by the vertical pedestals 5 5, which are also of flat wrought-iron and bent at their ends at right angles, through which bent ends and the wheel-piece 10 and bar 6 bolts are passed, which securely hold the whole together.

Between the upper ends of the pedestals 5 5 and the under side of the longitudinal wheel-piece 10 the inverted-arch bar 15 is placed. This bar acts as a brace to strengthen the side frames, the lower bends in it passing under the transoms 20, which securely connect the two side frames together by the queen-post castings 39, fitted between the tops of them and the under side of the wheel-piece 10, and the transom pillar castings 29, fitted between the under sides of them and the bar 6, the whole being firmly held together by means of long bolts passing vertically through them.

The pedestals 5 5 are arranged in pairs, as shown, one pair being placed at each end of longitudinal wheel-piece 10 and bar 6 and one pair in the center of them. The pedestals in each pair are such a distance apart as to just admit the axle-boxes 3 3 and the transverse suspension-links 46 46, so that they have no longitudinal play, but are free to move transversely therein in relation to the position of the truck on the rails. The axle-boxes 3 3 and the transverse suspension-links 46 46, it will thus be observed, are surrounded by portions of the side frames, which form perfectly-rigid pedestal protection therefor, protecting said boxes and links from injury due to the truck striking any obstacle, as well as enabling me to make a strong, light, and durable truck-frame by such construction.

The lower ends of the transverse suspension-links 46 46 are enlarged and provided with openings, the lower sides of which are semicircular, and made to fit into grooves formed in the longitudinal bar 6, of a width equal to the thickness of the links. These grooves are formed in the under side of the bar 6 only, and correspond to the semicircles in the openings in the lower ends of the links, so that the links may partly rotate on the bar 6, as shown in Figs. 4 and 5, which also clearly show the manner in which the upper ends of the transverse suspension-links are connected to the axle-boxes 3 3, so as to allow the boxes to move transversely to the side frames, the links by such movements assuming inclined positions to the side frames and boxes. The upper ends of the links 46 46 fit on the ends of the short shafts or rods $g'$, which set into grooves formed in the top of the caps $f'$, made so as to slide freely up and down in the receptacles $f^2$ on the top of the axle-boxes 3, and cast in one piece therewith. In these receptacles are placed the springs $g^2$, under the caps $f'$, the caps being provided with lugs, as shown, which fit into the spaces left between the springs and the square corners of the receptacles, and so prevent the caps $f'$ from tilting and becoming wedged in the receptacles as they move up or down therein.

In the ordinary working of the truck the axle-boxes 3 3 never move laterally a sufficient distance to bring the ends of the shafts or rods $g'$ beyond the sides of the pedestals 5 5, so it is not generally necessary to secure them to the links 46 46; but to insure their always keeping in place I propose to secure the links to the ends of the shafts $g'$ $g'$ by set-screws or pins, or riveting over the ends of the rods $g'$, which at the same time causes the shafts $g'$ $g'$ to turn in their bearings on the caps $f'$ $f'$, instead of the links 46 46 turning on them.

In the side of the receptacles $f^2$ $f^2$ are formed slots, as shown in dotted lines in Fig. 5, to allow the shafts $g'$ $g'$ to move down therein as the springs $g^2$ are compressed by the weight of the car-body, &c., through the medium of the transverse links 46 46.

The lower parts of the boxes 3 3 are constructed and fitted with brasses as ordinarily, in which the axles 2 2, on which the wheels 1 1 are secured, have their bearings, with the exception of there being no end-play between the journals and the brasses and no saddles to the brasses.

Between each pair of transoms 20 20 are placed the bolsters 30 30, which are free to move up and down, but are prevented from moving endwise by means of the pins $d^3$ $d^3$, placed in them to come in contact with the queen-post castings 39 of the side frames. These bolsters are held up by the springs 80 80, which are held in the U-shaped pieces 43 43, the upper ends of which are bolted to the transoms 20 20.

To the top of the bolster 30, which is between the two pairs of wheels nearest the end of the car-body, are secured by bolts the standards $l$, in the upper ends of which is fastened the shaft $m$, and on the shaft $m$ hang the two longitudinal links $n$ $n$, through the lower ends of which is supported the shaft $o$. This shaft $o$ is firmly held in the lower ends of the two reverse standards $p$ $p$, bolted firmly to the car-body bolster 12. The holes in links $n$ $n$, through which the shafts $m$ and $o$ pass, are counter-bored from both sides toward the center, as shown in Figs. 8 and 9, so that they are free to swivel on the shafts $m$ and $o$, as well as rotate in a longitudinal direction thereon. The shaft $o$ is of such a length that its ends just touch the insides of the standards $l$ $l$; and as this shaft is rigidly connected to the car-body by means of the reverse standards $p$ $p$, it will be observed that all transverse movement between the car-body and the truck is prevented, which is very important in car-trucks embodying the suspension-link principle, as any lateral play between the car-body and the truck imparts shocks to the car-body, for all transverse shocks must be entirely counteracted by the inclination given to the transverse links 46 46, and not by any lateral freedom of any other parts of the truck, for the advantages of the suspension-link principle to be obtained in its application to car-trucks.

It will also be observed that the lower ends of the links $n$ $n$ and the shaft $o$ are free to move in a longitudinal direction in relation to the truck, and vice versa; and to enable these links to swivel, which necessitates the shaft $o$ assuming an angular position to the shaft $m$, as shown in the plan view, Fig. 2, the ends of the shaft are made convex, the radius of the curvature of which is equal to the length of the shaft, as shown at the right-hand end of the enlarged view of the shaft $o$, Fig. 15, or rounded in the one direction, as shown at the left-hand end, thus allowing the shaft to assume any inclination from the perpendicular shown by a dotted line between the two inside faces of the standards $l$ $l$ until the opposite sides of the two ends pass beyond said perpendicular without there being any play between the ends of the shaft and the faces of the standards; and as this inclination is only exceeded when the car is passing around a very sharp curve, it is evident that in ordinary operation, or when the car is moving around the practically-operative curves of the road, the car-body is rigidly held to the truck as regards any lateral movement between them, the links swiveling on the shafts $m$ and $o$, as shown in Fig. 15, which represents the extreme position of the shaft $o$, when the car is passing around the curve. The link to the left, being nearest to the center of the curve, remains in a vertical position, or nearly so, and merely swivels, while the one to the right, or the outside link, is both swiveled and inclined, thus bringing the center of the swiveling action between the truck and car-body in line with the inside longitudinal suspension-link. This takes place particularly with four-wheel trucks, which have only one set of longitudinal suspension-links, as shown in Fig. 10, while with six-wheel trucks having two sets of links, as shown in Figs. 1, 2, and 3, this center of swiveling would probably be somewhat changed from the position just described, but not sufficiently to materially alter the operation of the links $n$ $n$ and shaft $o$, as described.

The standards $l'$ $l'$ on the bolster 30, the shaft $m$, and the reverse standards $p'$ $p'$ on the body-bolster 12 are the same, as regards construction and relative positions, as the standards $l l$, shaft $m$, and reverse standards $p$ $p$. The links $n'$ $n'$ are of the same construction as the links $n$ $n$; but instead of being placed between the standards $l'$ $l'$ and the reverse standards $p'$ $p'$, as are the links $n$ $n$ placed between the standards $l$ $l$ and reverse standards $p$ $p$, they are placed inside the reverse standards $p'$ $p'$, and the shaft $o'$, instead of fitting between the standards, as does the shaft $o$, does not project beyond the reverse standards $p'$ $p'$, thus allowing these standards, with the part of the car-body to which they are secured, and the truck to move laterally relatively to each other only when passing around curves, as is clearly shown in the plan view, Fig. 2, in which the dotted line $y$ $y$ is the center line of the truck, and the dotted line $z$ $z$ is the center line of the car-body.

The flat iron bars 51 51 are secured to the transoms 20 20, and surround the axles 2 2, but do not touch them. They act as safety-bars to hold up the axles should any of them become fractured or broken. They are also employed to hold the brake-beams 84 84, which slide on the lower parts of them, and which are held in place by the angle-pieces $r r$. (Shown in dotted lines in Fig. 1.)

At the ends on the top and bottom of the brake-beams 84 84, which may be of wood or channel-iron, as shown in Figs. 6 and 7, are secured the brake-blocks 82 82, having two projecting ears or lugs, between which fit the projecting hooks on the back of the brake-shoes 98 98. In the ears of the upper brake-blocks are permanently fixed the rods $t$, or these rods may be cast with the ears, and in the ears of the lower brake-blocks are holes, through which the bolts $t'$ pass. In securing the brake-shoes 98 in place, all that there is to do is to pass the upper hook over the rod $t$, push the lower hook between the ears on the lower block 82, and then pass the bolt $t'$ through the ears and the hook, holding the same in place preferably by means of a split pin passing through the free end of it. When the shoes become unevenly worn it requires only a few moments to reverse them in their position, which is done by withdrawing the bolt $t'$ and turning the shoe upper end down. The sides of the ears in the brake-blocks 82, as shown, are made so as to fit against the back of the shoes 98 98.

To insure the brakes moving laterally with the wheels, should they have play sufficient or be worn enough to pass by the flanges of the wheels, the pins $t^4$ $t^4$ are fixed in the beams 84 84 in close proximity to the insides of the wheels.

In the drawings no device is shown for operating the brakes. They may be operated by the ordinary or other suitable means.

The side frames of the four-wheel freight-truck, as represented in Figs. 10 and 11, are constructed in a similar manner to those just described, with the exceptions of the top bar, 10, being made of wrought-iron instead of wood, and one wooden transom, 20, substituted for the two, the standards $l^2$ $l^2$ being bolted directly to the transom 20, so that they are rigidly connected to the frames without any springs between them. The shaft $m^2$, links $n^2$ $n^2$, shaft $o^2$, and reverse standards $p^2$ $p^2$ are of the same construction as the shaft $m$, links $n$ $n$, shaft $o$, and reverse standards $p$ $p$ of Figs. 1, 2, and 3, as are also the axle-boxes and counnections, so it is unnecessary here to further describe them.

In narrow-gage trucks the shaft $m^2$ may be connected directly on the side frames, the standards $l^2$ $l^2$ being dispensed with, the ends of the shaft $o^2$ then bearing against the side frames or against angle-pieces bolted to the transom 20.

Four-wheel passenger-trucks would be made as represented by all of the parts of Figs. 1 and 2 to the left of the dotted line $x'$ $x'$.

Instead of making the pedestals 5 of wrought-iron, they may be made of cast-iron, the whole cast in one piece, in the usual manner, and bolted to the longitudinal bars 10 6.

Fig. 12 represents the manner I propose to adopt in applying the transverse suspension-links to horse-cars or to four or six wheel coal-cars. The longitudinal links $n$ $n$ are not necessary for such purposes. These pedestals are bolted to the pedestal-timber 169, the space between them being wide enough to admit the axle-boxes 3 and links 46 46, which are made, as before described, with the springs $g'$ in the receptacles $f^2$. The lower ends of the links 46 46 turn on a piece of pipe, $u$, which fits in between the lower ends of the pedestals. Bolts $v$ $v$ pass through the pedestals and the pipes $u$, and by means of the nuts $v'$ $v'$ connect the lower ends of the pedestals rigidly together. A light wrought-iron pedestal tie-bar, 6, connects the bolts $v$ $v$ by being welded to their inside ends, the right degree of strain being given to it by adjusting the nuts $v'$ $v'$ on the bolts $v$ $v$. The whole may be further strengthened, if desired, by bracing the pedestal-timber 169 between the pedestals.

To apply equalizing-bars to trucks embodying the suspension-link principle, I propose to adopt the method shown in Figs. 13 and 14, in which the lateral links 46 46 are at their upper ends connected to the axle-boxes 3 by a bolt passing through them and the upper part of the boxes, or resting in slots in the top of the boxes, there being no springs in the boxes.

The boxes 3 and the links 46 46 are held in place by the pedestals 5. The ends of the equalizing-bar 71 pass through the lower ends of the lateral links 46 46, and also through openings made therefor in the sides of the pedestals, so that the equalizing-bars and lower ends of the links have no lateral movement in relation to the pedestal, but are free to move up and down therein. The lower ends of the pedestals are connected together by means of the tie-bar 6.

Between the tops of the equalizing-bars 71 and the under side of the wheel-piece 10 are placed the springs 79, in the usual manner.

The side frames I propose to construct in the manner shown; but they may be made in any other suitable manner.

The two wheel-pieces 10 10 are connected together by the transom 20, by means of bolts passing through them and the queen-posts 39 39, and strengthened by the wheel-piece truss-rods 13 13. On the transom 20 are secured the standards $l$ $l$ and shaft $m$, carrying the longitudinal links $n$ $n$, shaft $o$, and reverse standards $p$ $p$.

When it is desired to use springs between the car-body and the truck-frame, then the construction substantially like that shown in Figs. 1, 2, and 3 will be adopted.

In the modifications, Figs. 16 and 17, which show a truck made entirely of iron, the transoms 20 20 are dispensed with and the bolster holds the two side frames together. This bolster is formed of two pieces of channel-iron, 30 30, fastened together by flat pieces of iron, 31 31, two on their upper sides, on which are secured the standards $l$ $l$, and one on the under side, in the center. They are also held together at their ends by the bent pieces of iron 43, which rest on the tops of the bolster-spring caps 75. The lower ends of these springs set into a seat, 74, resting on the central part of inverted-arch bar 15, which extends downward from between the tops of the pedestals 5 5 and the under side of the wheel-piece 10 to the central part of the tie-bar 6.

The wheel-piece 10, inverted-arch bar 15, and pedestal tie-bar 6 are connected together by bolts passing through them and the casting, the side pieces, 37, of which are rectangular in cross-section, and they act as guide-bars for the bolster 30, the flanges of the channel-iron being cut so as to embrace them, and free to move up and down thereon, but without any play, thereby holding the two side frames of the truck parallel with one another, at the same time allowing the bolster-springs 80 at either end of the bolster 30 to be compressed independently of those at the other end. The springs 80 are prevented from forcing the bolster 30 above a certain height by projections on the rectangular portions of the bolster guide-bars 37.

The pedestals 5 5 are constructed, as before described, to form rigid protections for the axle-boxes 3 3 and transverse links 46 46. These links, instead of bearing against the outside of the spring-receptacles $f^2$, hang in recesses formed in the sides of receptacles and boxes 3 3, and they are connected together at their upper ends by a square bar of iron, $g'$, the under side of which is rounded, so as to turn in a groove made in the top of the cap $f'$, resting on the top of the spring $g^2$, the sides of the links being in contact with the cap and not in contact with the sides of the receptacle $f^2$, as before described, the sides of the receptacle being cut away, as shown at the left-hand side of Fig. 17.

The lower ends of the links 46 46 are formed into eyes by first splitting them and then bending the two split parts and welding them together, and instead of bearing in grooves formed in the pedestal tie-bar 6 they bear on a cast-iron bearing-plate, $i$, formed on their under sides to correspond to the circle of the eyes of the links 46, which hold them against the under side of the pedestal tie-bar 6, and they are prevented from moving longitudinally on the bar by the flanges $i'$, against which the inside of the links 46 bear. This construction of the spring-receptacle $f^2$, links 46 46, and separable bearing-plate $i$ may be applied to any of the trucks before described.

The standards $l\ l$, shaft $m$, longitudinal links $n\ n$, shaft $o$, and reverse standards $p\ p$, secured to the car-body bolster 12, are similar in every respect to those before described; but I would here remark that by making the bolster 30 of two pieces with a space between them I am enabled to either make the links $n\ n$ longer or drop the whole of this movement down some distance, as the lower ends of the links and reverse standards can oscillate in the space between the two pieces of channel-iron.

Having now described my invention, I wish it understood that I do not claim anything that is shown or described in the before-mentioned Letters Patent No. 208,857, and bearing date the 8th day of October, 1878; but

What I do claim, and desire to secure by Letters Patent, is—

1. As an improvement in suspension car-trucks, in combination, the shaft $m$, secured in standards $l\ l$ on the transom 30 of the truck, the shaft $o$, secured in the reverse standards $p\ p$ on the car-body and rounded at its ends to fit against the inside faces of the standards $l\ l$, and the suspension-links $n\ n$, whose bearing-holes are circular throughout, and from their centers, which fit on the shafts $m$ and $o$, increase in size to their outer ends, substantially as and for the purpose hereinbefore set forth.

2. In a six-wheel car-truck, the combination of a suspension system composed of the shaft $o$, secured to the car-body with its ends bearing against fixed pieces on the truck-frame, the shaft $m$, secured to the truck, and the links $n\ n$, connecting the shafts $o$ and $m$ together, so that the truck and car-body are free to swivel in relation to each other, but are rigidly held as regards lateral movement, with a suspension system composed of the shaft $o'$, secured to the car-body, the shaft $m'$, secured to the truck, connected together by the links $n'\ n'$ in such a manner that the parts of the truck and car-body so connected are free to swivel and to move laterally in relation to one another, substantially as and for the purposes hereinbefore set forth.

3. The combination of the axle-box 3, provided with the receptacle $f^2$, spring $g^2$, cap $f'$, rod $g'$, and the links 46 46, substantially as and for the purpose hereinbefore set forth.

4. The combination of the side frames of a car-truck, consisting of the wheel-piece 10 and bar 6 and pedestals 5 5, with the links 46 46, fitted at their lower ends to turn in grooves made in the bar 6, and pivoted at their upper ends to the axle-boxes 3, substantially in the manner and for the purposes hereinbefore set forth.

5. As an improvement in suspension car-trucks, in combination, the rigid pedestal 5, the links 46 46, fitted to rock at their lower ends on the tie-bar of the pedestal, and the axle-box 3, connected by a rocking bearing to the upper ends of the links when said links are fitted between the sides of the pedestal and sides of the axle-box, so as to allow the axle-box to move laterally in relation to the truck, but prevent it moving in a longitudinal direction thereto, substantially as and for the purposes hereinbefore set forth.

In testimony whereof I have hereunto set my hand this 24th day of February, A. D. 1880.

E. RICHARD ESMOND.

Witnesses:
JAMES A. HUDSON,
JAMES W. CHISHOLM.